Dec. 17, 1968     D. F. BECKER     3,417,277
PROTECTIVE MEANS FOR ELECTRIC METER CIRCUITS
Filed Dec. 27, 1965     2 Sheets-Sheet 1

Inventor
Dale F. Becker,
By Brown Jackson Boettcher & Dienner
Attys.

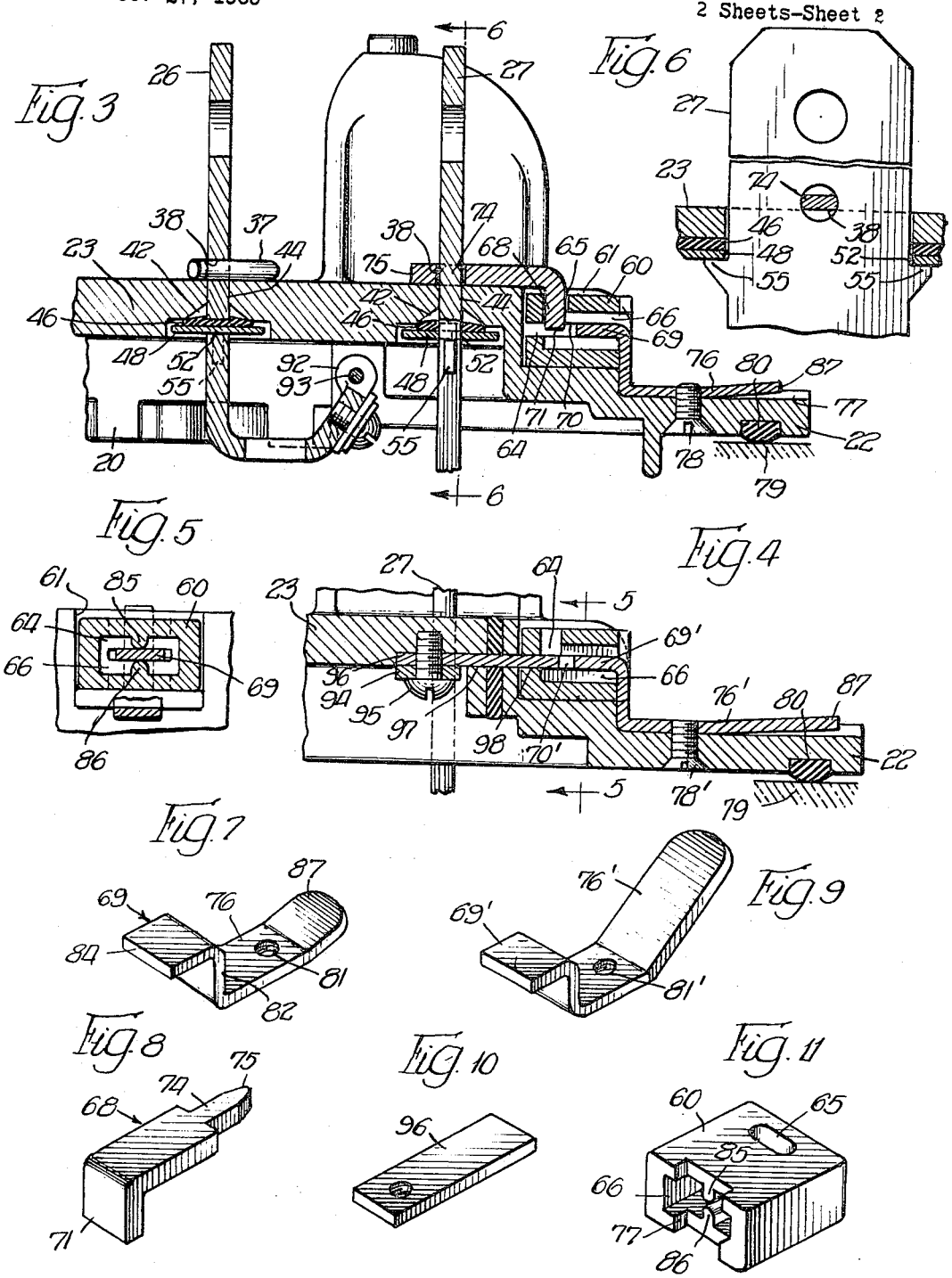

United States Patent Office 3,417,277
Patented Dec. 17, 1968

3,417,277
PROTECTIVE MEANS FOR ELECTRIC METER CIRCUITS
Dale F. Becker, Springfield, Ill., assignor to Sangamo Electric Company, Springfield, Ill., a corporation of Delaware
Filed Dec. 27, 1965, Ser. No. 516,300
14 Claims. (Cl. 313—325)

ABSTRACT OF THE DISCLOSURE

Protective arcing apparatus for electric meters wherein the arcing electrodes for establishing the arc-gaps and the arcing chamber blocks in which said electrodes are mounted, are readily removable and replaceable without requiring disassembly of the meter. Also, wherein the direction of gaseous discharge from these arc-gaps is towards the side against the socket enclosure which is at ground potential so that the ionized gas does not go back toward the terminals where it might introduce power follow-ups with great damage to the installation. The venting of the arc-chamber in this way tends to avoid a sustained arc and encourages blow-out.

---

For some years, it has been the practice to connect watt-hour meters directly to utility power lines without intervening fuses or disconnects to protect the meter from voltage surges on the lines, which might be caused by lightning striking some point on the system. This would often result in an arc-over somewhere within the meter, and, in some cases, would so damage the meter that a power follow-up would result in even more damage. This led to the adoption of arc-gaps within the meter near the incoming terminals, which serve to localize any arcing which occurs and limits voltage stresses on other and more vulnerable parts of the meter. These were located inside the meter enclosures and, in many cases, permitted damage to the meter in cases of arc-over.

In the case of socket type meters which are used in the overwhelming majority of installations today, arc-gaps came to be placed outside of the meter enclosure, on the back of the mounting plate in the socket connection chamber. Some of these were placed in wells with replaceable liners on the walls of the wells, but in cases of severe arcing, the electrodes of the arc gap were damaged and the discharge caused power follow-ups within the terminal chamber.

The fundamental object of the invention is to provide an improved construction of arc-gap for electric meters.

The improved arc-gap disclosed herein comprises an arcing chamber, a live arcing electrode entering said arcing chamber from one of the live meter terminals, and a grounded arcing electrode entering said chamber from a grounding point on the mounting socket. The arcing chamber is disposed on the outside of the meter within the mounting socket, and the two arcing electrodes have their proximate arcing tips disposed in said arcing chamber substantially externally of the meter. The arcing chamber has a venting discharge passageway which directs the high velocity ionized gases resulting from an arc in a direction away from the live terminals of the meter and toward the wall of the mounting socket which is grounded. The direction of discharge and the high velocity of these gases prevents sustained arcs and provides power follow-up protection for self-contained meters.

The terminal or live locking electrode serves to hold the meter terminal in the base assembly, serves as one electrode of the arc-gap and assists in holding the arcing chamber in place. It makes a good electrical connection to the line terminal and serves as a bus bar to the electrode.

The grounding electrode also serves to hold the arc chamber in place as well as the terminal locking electrode and provides a spring connection to the rim of the mounting socket, which is connected with ground. This grounding electrode is held in place by means of a screw through the meter base plate requiring the breaking of the meter seal and removal of the glass cover in order to disassemble. This is to prevent the unauthorized removal of this grounding electrode by the meter installer.

Another object is to provide an improved releasable locking relation between the live arcing electrode and the associated connector terminal. This is accomplished by providing the live arcing electrode with a locking prong which enters a hole in the associated connector terminal with a snug fit, so as to hold the connector terminal in place and to establish an electrical connection therebetween.

All three parts of this arc gap assembly, consisting of the two electrodes and the arc chamber which are subject to any damage by arc-over, are readily replaceable.

Other objects of the invention pertain to an improved sealed mounting of the phase terminals in the meter base and to the provision of improved fiberglass filtered breathing portions. These objects and advantages will be more apparent from the following detailed description of one preferred embodiment of the invention. In the accompanying drawings illustrating such embodiment:

FIGURE 3 is a fragmentary sectional view taken approximately on the plane of the line 3—3 of FIGURE 1, but on a larger scale;

FIGURE 4 is a similar view on the line 4—4 of FIGURE 1;

FIGURE 5 is a detail sectional view on the plane of the line 5—5 of FIGURE 4;

FIGURE 6 is a fragmentary sectional view on the plane of the line 6—6 of FIGURE 3;

FIGURES 7, 8, 9 and 10 are perspective views of the several arcing electrodes; and FIGURE 11 is a perspective view of the arcing chamber block.

Figure 1:
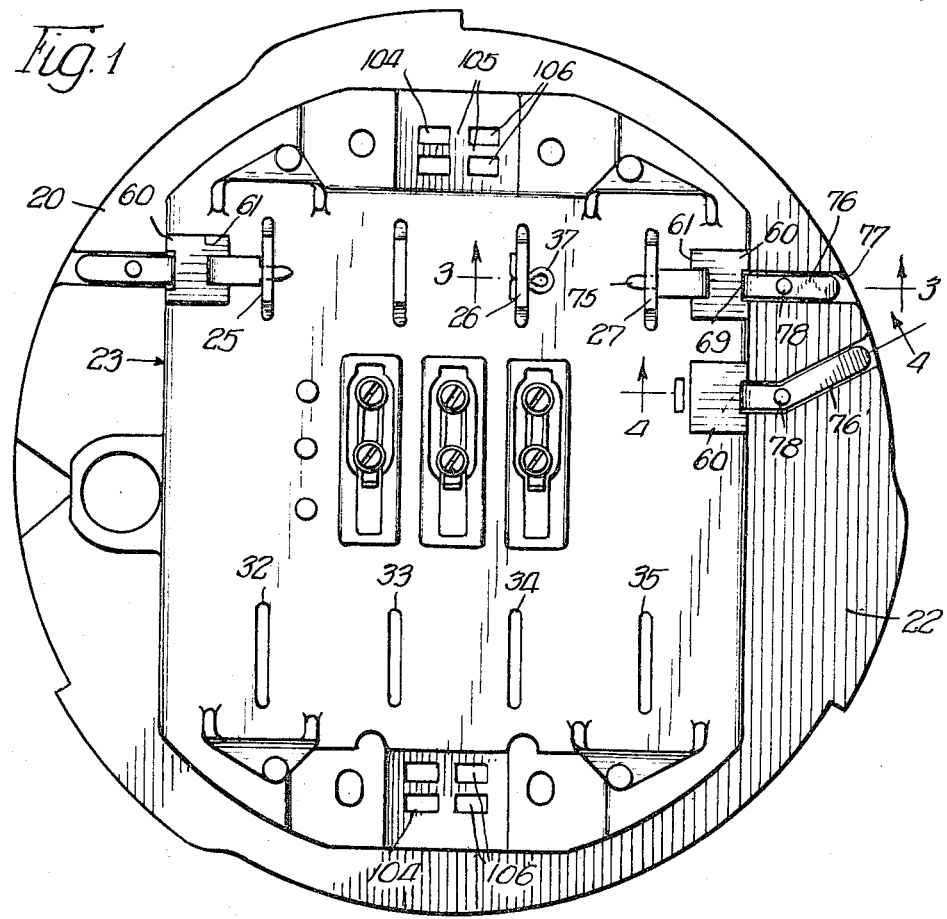
FIGURE 1 is a rear elevational view of a meter base embodying the aforesaid improvements.

The meter base designated 20 in FIGURE 1 may be of any appropriate material, but I find it preferable to have a high strength, glass-filled alkyd resin base, which insures minimum breakage and arc tracking. This base is formed with a main circular portion 22, having a raised rectangular deck or platform portion 23 integral therewith. Projecting through the upper portion of this platform is a horizontally disposed series of slots for mounting connector terminals 25, 26 and 27, and projecting through the lower portion of this raised platform is a horizontally disposed series of slots 32, 33, 34 and 35 in which may be mounted another horizontal series of connector terminals. Ordinarily, each of these connector terminals is held against rearward displacement in the base by cotter pins 37 (FIGURE 3) which pass through holes 38 in the connector terminals, such as the terminal 26, and have their prong ends spread apart to bear against the top surface of the platform 23. However, when providing the device with the improved arc-gaps for the two outer phase terminals, 25 and 27, the cotter pins are omitted from these terminals, and the inner portions of the live arcing electrodes are inserted in the holes 38 in lieu of the cotter pins, as will be presently described.

Referring now to the anchoring of all of the connector terminals from the back side of the base, as best shown in FIGURE 3, each of the terminals extends through an elongated depression 42 molded in the inner surface of the raised deck 23. Formed in the bottom of this elongated depression 42 is a slot 44 through which the connector terminal, such as 27, passes. An elastomer gasket 46 is held pressed into the bottom of the elongated depression 42 by a pressure plate 48 of substantially the size and shape of the depression. This pressure plate 48 has a long narrow slot 52 therein through which passes the associated connector terminal, such as 27. As shown in FIGURE 6, both edges of each connector terminal, such as 27, are punched transversely to form locking lugs or spurs 55 projecting outwardly beyond the top and bottom edges of the connector terminal to abut the top and bottom ends of the slot 52. These lugs or spurs strike the ends of the slot 52 and limit rearward movement of the connector terminal in the raised deck 23 of the meter base 20 toward the socket mount. The elastomer gasket 46 is put under compression pressure in forcing the terminal inwardly far enough to permit the insertion of the cotter pin 37 (or of the prong end 75 to be later described) transversely through the hole 38. Thus, each connector terminal has a sealed mounting in the meter base, but the elasticity of the elastomer gasket affords flexibility of terminal positioning.

Referring now to the improved arc-gaps, the gaps for the two outer connector terminals 25 and 27 (FIGURE 1) in the upper row are identical in construction and will be described first. This construction which will be described with reference to terminal 27 in FIGURES 3, 4 and 11, comprises an arcing chamber block 60 of rectangular outline which fits into a rectangular recess 61 that is molded in the shoulder portion of the raised platform 23. This arcing block 60 is molded of a material having a high dielectric value and a high fusing point, preferably of polypropylene or some similar material. Molded within said arcing block 60 is an arcing chamber 64, which has a front slot 65 opening into the top of the arcing chamber, and also has an outer or lateral passageway 66 opening laterally into the arcing chamber. The live arcing electrode 68 extends down into this front slot 65, and the grounded arcing electrode 69 enters laterally into the side or lateral passageway 66. These two arcing electrodes come into close proximity to each other within the arcing chamber to form the arc-gap 70 therebetween.

Referring now to the details of the front or live arcing electrode 68 (FIGURE 8), this is in the form of a rectangular stamping having an arcing tip 71 which is bent rearwardly to enter the front slot 65 in the block, constituting the live arcing electrode within the arcing chamber. This arcing tip 71 has a rather snug fit in the slot 65. The other end of the body portion is reduced down into the form of a prong 74 having a pointed end 75. This reduced prong has a push fit through the circular hole 38 in the connector terminal 27. Thus, the prong end 74 takes the place of the cotter pin for anchoring the connector terminal 27 against forward displacement toward the glass cover. It also establishes the arcing electrode 68 as a live electrode maintained at line voltage. The conventional glass cover 79 has the customary pressure sealing engagement against the conventional sealing ring 80 of rubber or like material recessed in the face of the meter base 22.

Referring now to the grounded arcing electrode 69 (FIGURE 7), this comprises an anchoring tongue portion 76 which fits in a channel-shaped depression 77 molded in the face of the meter base. A fastening screw 78 extends rearwardly from the front side of the meter base, and screws into a threaded hole 81 in the tongue 76 for holding this ground electrode in place. This inner portion of this grounded electrode is bent to extend forwardly at 82 and is then bent inwardly to form the grounded arcing tip 84 (FIGURE 7) located in close proximity to the live arcing tip 71, the arc-gap 70 intervening therebetween.

It will be seen from FIGURES 5 and 10 that the laterally extending passageway 66 is substantially larger in cross-sectional area than the grounded arcing electrode 69 which enters this passageway. This affords ample venting space for the arc gases above and below and to each side of the electrode 69. Front and rear beaded ribs 85 and 86 project integrally from opposite walls of this venting passageway for holding this portion of the grounded electrode 69 properly centered in such venting passageway.

The grounding terminals 76 project out toward the perimeter of the base for establishing grounds with the metallic meter socket which is grounded. As shown in FIGURE 3, those portions of each grounding projection extending beyond the anchoring screws 78 have a slight upward tilt, as shown at 87, to insure continuous resilient engagement with the grounding portion of the mounting socket.

Referring now to the third arc-gap 90 for the third phase of a three-phase meter, the intermediate connector terminal 26 constitutes the terminal for such third phase. Such third phase terminal may be held against rearward displacement in the meter base by a cotter pin 37, in the manner previously described of the other connector terminals. On the opposite side of the meter base, this third terminal has the same sealing arrangement, with an elastomer gasket 46 and an elongated pressure plate 48, as previously described.

Figure 2:
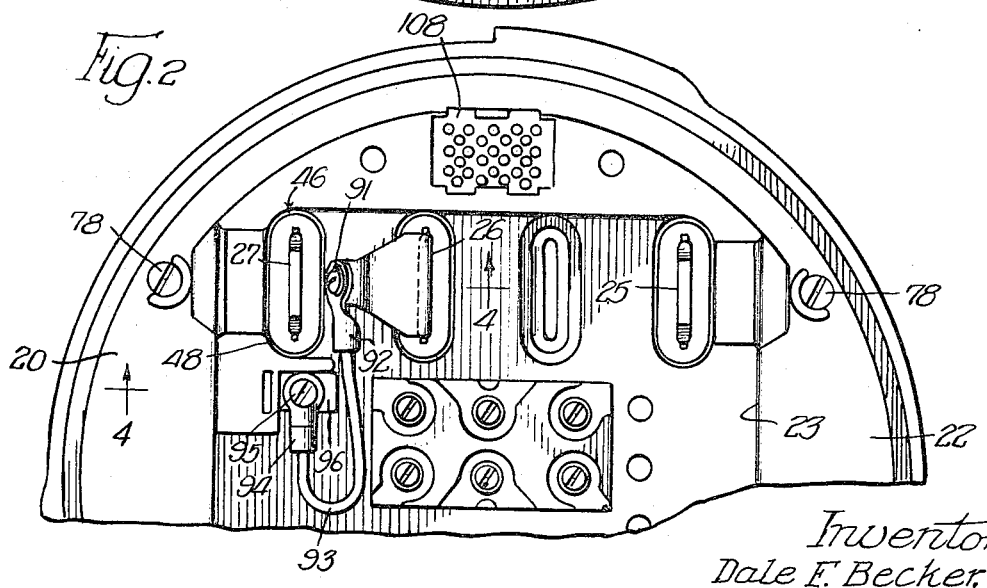
FIGURE 2 is a fragmentary front elevational view of the upper rear part of the meter base.

Secured to the inner or rear end of this third connector terminal by a screw 91 is a connector clip 92 (FIGURE 2) to which is secured a heavy conductor 93. This conductor is bent and looped downwardly for making crimped or soldered connection with a connector clip 94. A screw 95 passes through this latter clip, and screws into a threaded hole in an inner live arcing terminal 96. This live terminal 96 extends outwardly through a lateral hole 97 (FIGURE 4) in the base and through a snug fitting slot 98 in the arcing block 60, from whence it enters the arcing chamber 64 within the block.

The grounded arcing electrode 69' has the same mounting in this third block as previously described of the electrode 69, the only difference being that the outwardly projecting grounding tab 76' extends at an oblique angle (see FIGURE 1) toward the periphery of the meter base. This grounding tab has the same slight upward tilt that was previously described in connection with the other grounding tabs 76.

At the top and bottom ends of the platform area are provided breathing ports 104. These each comprise a grill 105 formed integral with the base, and behind which is a filter pad 106 of fiber glass (FIGURE 1). On the backside of the fiber glass pad (FIGURE 2) is a perforated screen 108, composed of brass, aluminum or other appropriate material, which screen holds the pad 106 in place. These breathing ports exclude dust and also provide for condensation drainage.

In the operation of the device, the surge of an abnormally high voltage, such as from a bolt of lightning, will generally result in an arc discharge at one or more of the arc-gaps 70 or 70'. Such an arcing discharge will immediately generate a large volume of ionized gas under pressure at the arc-gap, which will find quickest relief through the venting passageway 66 leading from that gap. This passageway will discharge the arc gases in a direction substantially parallel to the base portion 22 and laterally away from the live parts of the meter and of the meter socket at a high velocity, thereby tending to quench the arc and to minimize the damage to the arcing electrodes.

However, when the arcing has damaged the electrodes or the arcing chamber severely, they can be readily replaced by removing the grounded arcing electrode through release of the screw 78 and then withdrawing the arcing block and the prong from the associated line terminal. In the event of damage to the electrodes or arcing chamber associated with line terminal 26, they can be readily replaced through release of screw 78 and screw 95.

It will thus be seen that the screws 78, 78' and 95, either alone or with associated parts, constitute readily releasable fastening means for enabling the arcing electrodes 68, 69, 69' and the arcing chamber 64 to be easily removed for inspection, repair or replacement, without requiring disassembly of the meter.

While I have illustrated and described what I regard to be the preferred embodiment of the invention, nevertheless it will be understood that such is merely exemplary, and that numerous modifications and rearrangements may be made therein without departing from the invention.

I claim:

1. In an electric meter, the combination of a base plate, a connector terminal carried by said base plate, and an arc-gap for said connector terminal, said arc-gap comprising an arcing chamber carried by said base plate, a grounded arcing electrode entering said arcing chamber, a live arcing electrode entering said arcing chamber, said grounded and live arcing electrodes defining an arc-gap therebetween within said arcing chamber, means projecting from said live arcing electrode for establishing electrical connection with said connector terminal a venting passageway extending laterally from said arcing chamber for discharging the arcing gases in a direction laterally away from said connector terminal, and fastening means readily releasable externally of the meter for normally holding said two arcing electrodes in operative relation, and adapted upon release to permit said two arcing electrodes to be withdrawn without requiring disassembly of the meter.

2. The combination of claim 1 wherein a projecting prong extends from said live arcing electrode and enters a hole in said connector terminal for holding said connector terminal in said base plate and establishing an electrical connection between said connector terminal and said live arcing electrode.

3. The combination of claim 1 wherein said live arcing electrode extends through said base plate, and is connected by a conductor to said connector terminal on the opposite side of said base plate.

4. The combination of claim 1 wherein the rear face of said base plate has a recess therein, and said arcing chamber is removably seated therein.

5. The combination of claim 1 wherein said arcing chamber is formed within an arcing chamber block which is removably mounted in said base plate, and wherein a venting passageway leads from said arcing chamber laterally through said block for external discharge laterally of said meter.

6. The combination of claim 5 wherein said grounded arcing electrode extends outwardly through said venting passageway.

7. The combination of claim 6 wherein ribs project from opposite walls of said venting passageway to hold said grounded arcing electrode spaced from the walls of said passageway.

8. The combination of claim 1 wherein said live arcing electrode is held in place by said arcing chamber, and said arcing chamber is held in place by said grounded arcing electrode, and releasable threaded means is provided for holding said grounded arcing electrode in place on said base plate.

9. The combination of claim 1 wherein said live arcing electrode extends across the back face of said arcing chamber and has an arcing tip bent substantially at right angles and entering said arcing chamber through an aperture in said back face.

10. The combination of claim 1 wherein said grounded arcing electrode has an attaching tongue attached to said base plate, and wherein said tongue is then bent outwardly across the end face of said arcing chamber, and is then bent laterally to form the arcing tip entering said arcing chamber.

11. The combination of claim 1 wherein said connector terminal passes through a slot in said base plate, and wherein a yieldable sealing member and a presser plate establish a flexible seal between said connector terminal and said slot.

12. In an arc-gap for electric meters the combination of a base plate, a connector terminal mounted in said base plate, a recess in one side of said base plate, an arc gap insulating block removably mounted in said recess, an arc gap defined in said block, a grounded arcing electrode entering said arc gap, a live arcing electrode having an outer end entering said arc gap and having an inner end extending through said base plate to the opposite side thereof, and a bendable wire type of conductor having one end secured to said connector terminal and its other end secured to the inner end of said live arcing electrode.

13. In an electroc meter, the combination of a base portion, a connector terminal carried by said base portion, an arc-gap for said connector terminal, said arc-gap comprising an arcing chamber carried by said base portion, a grounded arcing electrode entering said arcing chamber, a live arcing electrode entering said arcing chamber, said two arcing electrodes defining an arc-gap therebetween within said arcing chamber, means extending from said live arcing electrode for establishing electrical connection with said connector terminal, and a gaseous discharge passageway extending laterally outwardly from said arcing chamber for discharging the arcing gases in a direction substantially parallel to said base portion and away from said connector terminal, whereby said arcing gases are kept susbtantially away from contacting with said connector terminal.

14. The combination recited in claim 13 wherein fastening means is provided which is readily releasable externally of the meter for normally holding said arcing chamber and said two arcing electrodes in operative relation, and adapted upon release to permit said arcing chamber and said two arcing electrodes to be withdrawn without requiring disassembly of the meter.

References Cited

UNITED STATES PATENTS

| 2,300,922 | 11/1942 | Hodnette | 313—231.1 |
| 2,875,366 | 2/1959 | Bauman et al. | 313—231.1 |
| 2,889,494 | 6/1959 | Schmidt et al. | 313—231.1 |
| 2,922,953 | 1/1960 | Palmer | 324—156 X |

JOHN W. HUCKERT, *Primary Examiner.*

A. J. JAMES, *Assistant Examiner.*

U.S. Cl. X.R.

313—238; 317—65, 108